United States Patent [19]

Millray

[11] 4,062,287

[45] Dec. 13, 1977

[54] RESILIENT INSERT FOR TIRE INFLATOR

[75] Inventor: Robert Millray, Saugus, Calif.

[73] Assignee: Allied Chemical Corporation, Morris Township, N.J.

[21] Appl. No.: 757,543

[22] Filed: Jan. 7, 1977

Related U.S. Application Data

[63] Continuation of Ser. No. 554,790, March 3, 1975, abandoned.

[51] Int. Cl.² .................. F42B 3/04; B65B 31/00; B60C 23/10; B67B 7/24
[52] U.S. Cl. .................. 102/39; 141/38; 152/415; 222/3
[58] Field of Search .................. 102/39 R; 137/231; 141/38; 152/415; 222/3

[56] References Cited

U.S. PATENT DOCUMENTS

| | | | |
|---|---|---|---|
| 1,008,646 | 11/1911 | Kassner | 141/38 |
| 2,498,596 | 2/1950 | Wallach | 141/38 |
| 3,269,310 | 8/1966 | Wismar | 102/39 |
| 3,774,807 | 11/1973 | Keathley | 222/3 |
| 3,901,747 | 8/1975 | Garner | 149/42 |
| 3,912,562 | 10/1975 | Garner | 149/41 |

Primary Examiner—Stephen C. Bentley
Assistant Examiner—Donald P. Walsh
Attorney, Agent, or Firm—Ernest D. Buff

[57] ABSTRACT

The invention is a light, portable, miniaturized tire inflator adapted to fit in a limited space, such as in a tire well for a deflated, space-saving tire in a trunk of an automobile, and adapted to be carried or held in one hand. The tire inflator includes a metal, preferably steel pressure cannister comprising in one embodiment a pressure vessel and a pressure head cap assembly, a pyrotechnic material in the pressure vessel, an ignitor mechanism and a nozzle in the head cap assembly, an internal insulation liner for said pressure cannister to reduce the temperature level of the cannister to a level acceptable to an external insulation, such as plastic foam or paper, of about 350° F, and a resilient insert for example rubber, in the nozzle end to mate and thread in one embodiment, with the metal tire valve threads, and prevent cross threading, while providing a seal with the tire valve for inflation of the tire. The rubber insert also allows the tire inflator simply to be pushed on the valve and form the required seal, rather than threaded thereto, due to the resilient nature of the rubber.

5 Claims, 4 Drawing Figures

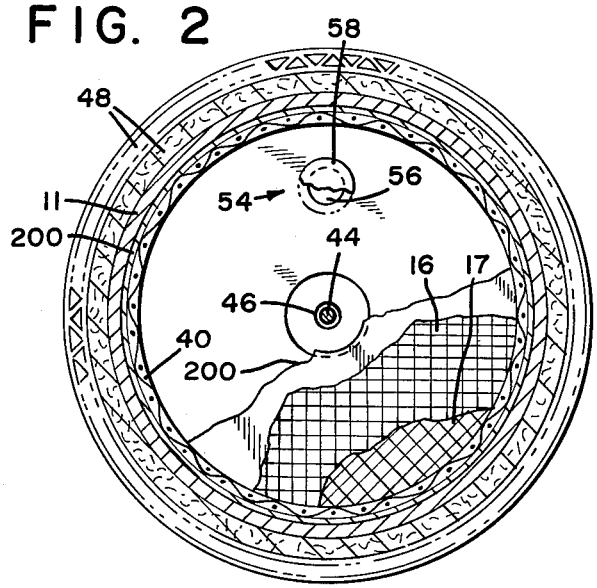
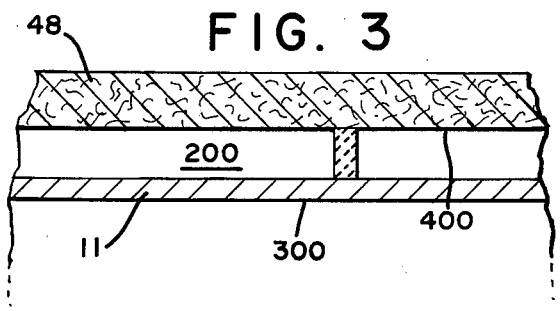
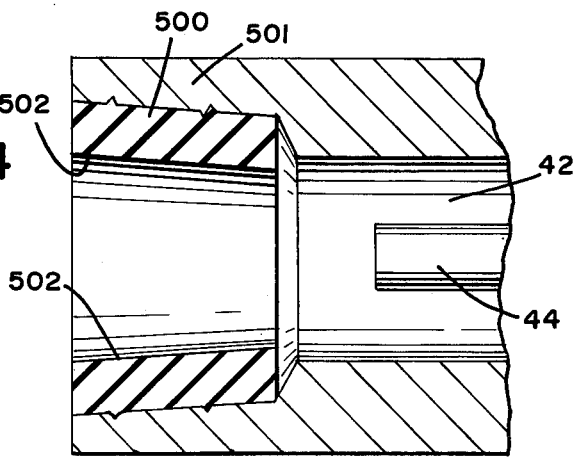

RESILIENT INSERT FOR TIRE INFLATOR

This is a continuation of application Ser. No. 554,790, filed Mar. 3, 1975, now abandoned.

BACKGROUND OF THE INVENTION

The invention relates to miniaturized apparatus for inflating a pneumatic tire, such as a tire used on an automobile, truck, bicycle or other vehicle. The apparatus is small enough to fit in a limited space, such as in a tire well for a deflated, space-saving tire in a trunk of an automobile or in a glove compartment of an automobile. The apparatus is light in weight, portable and can be carried or held in one hand by the user. The apparatus is adapted to be attached directly to a valve of a tire to inflate the tire. The inflating gas is derived solely from burning a pyrotechnic material, preferably a slow burning, compacted pyrotechnic material. The apparatus does not use a stored fluid of any type, neither a compressed nor a liquefied gas.

U.S. Pat. No. 1,008,646 to Kassner, issued in 1911, discloses an apparatus for inflating a tire which is transportable, but not miniaturized and which uses celluloid to generate a gas upon burning. The device of the Kassner patent is not attached directly to the tire valve. Modern tire inflation apparatus have heretofore depended upon a stored fluid, either compressed gas or liquefied gas, rather than a gas generated by burning a pyrotechnic material, as illustrated in U.S. Pat. Nos. 3,448,779 and 3,513,885 to Horwitt; 2,498,596 to Wallace; and 2,218,931 to Carlson. The use of a comparatively faster-burning pyrotechnic material to inflate a vehicle safety bag, without the use of a stored gas, is disclosed in U.S. Pat. Nos. 3,618,980 and 3,618,981 to Leising; and in U.S. patent application Ser. No. 316,947, filed Dec. 20, 1972 which is a continuation of U.S. patent application Ser. No. 110,845, filed Jan. 29, 1971, both entitled "Gas Generator," both filed in the name of John J. Sack and Thomas E. Lohr, and both having a common assignee with the present invention.

U.S. Patent application Ser. No. 520,506 filed Nov. 4, 1974, in the name of E. Garner and B. Hamilton, and having a common assignee with the present application, discloses a tire inflator of the type disclosed in this application, but which does not include the resilient insert such as a rubber or plastic embodiment to be described in detail hereinafter.

SUMMARY OF THE INVENTION

The invention is a light, portable, miniaturized tire inflator adapted to fit in a limited space, such as in a tire well for deflated, space-saving tire in a trunk of an automobile, and adapted to be carried or held in one hand. The tire inflator includes a metal, preferably steel pressure cannister comprising in one embodiment a pressure vessel and a pressure head cap assembly, a pyrotechnic material in the pressure vessel, an ignitor mechanism and a nozzle in the head cap assembly, and an internal insulation liner for said pressure cannister to reduce the temperature level of the cannister to a level acceptable to an external insulation, such as plastic foam or paper, of about 350° F. The pyrotechnic material generates an inflating gas upon burning to inflate a tire without a source of stored fluid. The ignitor mechanism is located adjacent to the pyrotechnic material to ignite and cause the pyrotechnic material to burn. The pressure vessel holds the pyrotechnic material. The pressure vessel has a tire end and an ignitor end. The nozzle is mounted on the tire end of the pressure vessel in the pressure head cap assembly. The nozzle is adapted to be connected directly to a valve of the tire. An internal insulation liner is located on the interior surface of the cannister (preferably to both the pressure vessel and the head cap assembly in the embodiment mentioned). A resilient insert, for example rubber or plastic, in the nozzle end mates and threads in one embodiment, with the metal tire valve threads, and prevents cross threading, while providing a seal with the tire valve for inflation of the tire. The rubber insert also allows the tire inflator alternately simply to be pushed on the valve and form the required seal rather than threaded thereto, due to the resilient nature of the rubber.

DESCRIPTION OF THE DRAWINGS

FIG. 2 is an end view of FIG. 1 in the direction of arrow A in FIG. 1.

FIG. 3 is a detail of the wall structure with the air liner embodiment.

FIG. 4 is a detailed showing of a preferred embodiment of the insert structure.

DETAILED DESCRIPTION

Figure 1:
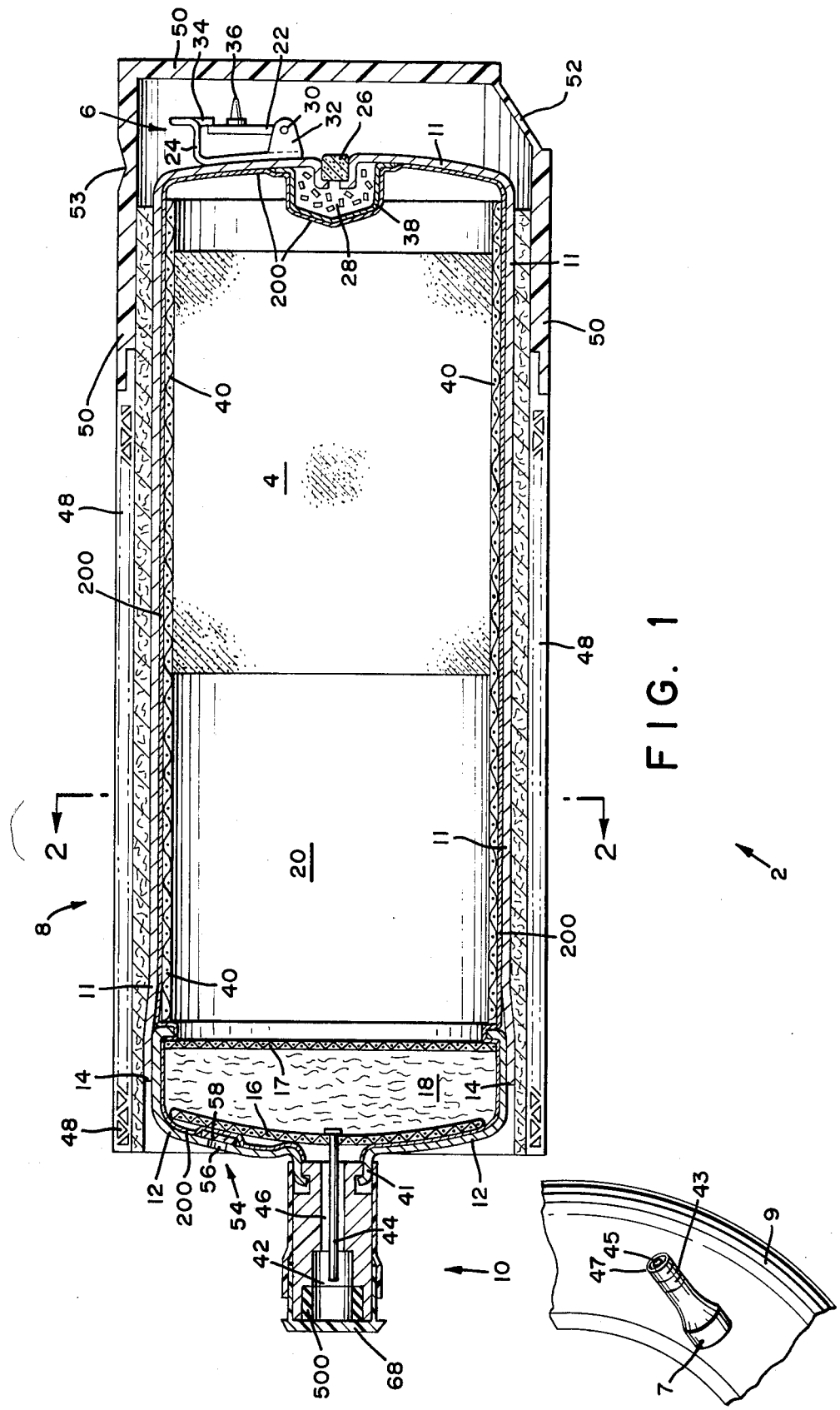
FIG. 1 is a cross-sectional view of a first embodiment of the tire inflator apparatus of this invention and a portion of a tire, including a tire valve, to be inflated by the tire inflator apparatus.

The invention is a light portable, miniaturized tire inflator, the embodiment shown of which is referred to generally by the numeral 2. The embodiment 2 of the tire inflator includes: a pyrotechnic material 4, an ignitor mechanism, referred to generally by the numeral 6; which may be at either end of the pressure vessel 8 but is shown at the end opposite the nozzle 10, a pressure vessel, referred to generally by the numeral 8; and a nozzle, referred to generally by the numeral 10. The pyrotechnic material 4 generates substantially non-toxic and non-condensible inflating gas upon ignition and burning to inflate a tire, without a source of stored fluid, either compressed gas or liquefied gas. The ignitor mechanism 6 in this illustrative embodiment is located adjacent to the pyrotechnic material 4 to ignite and cause the pyrotechnic material 4 to burn. The pressure vessel 8 holds the pyrotechnic material 4. The pressure vessel 8 in this embodiment has an pyrotechnic end, at which the ignitor mechanism 6 is located and a tire end at the opposite end of the pressure vessel 8 from the pyrotechnic mechanism 6. The nozzel 10 is mounted on the tire end of the pressure vessel 8, at the opposite end of the pressure vessel 8 from the ignitor mechanism 6. The nozzle 10 is adapted to be connected directly to an inlet valve 7 of a tire 9 to inflate the tire 9. The term "directly" means that the nozzle 10 may be connected to a tire valve 7 without any need for a hose or tube between the nozzle 10 and the tire valve 7. For example, the nozzle 10 may be screwed on the tire valve 7 or pushed thereon as will be decribed hereafter.

The pressure cannister in this embodiment includes the pressure vessel 8, comprising a chamber 11, and a pressure cannister cap 12. The chamber 11 has a cylindrical shape, a pyrotechnic end and a tire end. The tire end of the chamber 11 is open and has an outer edge 14. A portion of the cannister cap 12 is adapted to fit at, that is, either within or over the outer edge 14 of the tire end of the chamber 11. If the chamber 11 is arranged to fit over the outer edge 14, the outer edge 14 of the tire end of the chamber 11 may optionally be slightly larger in circumference as compared to the remainder of the chamber 11. The cannister cap 12 includes a first plate 16 and an optional coolant bed 18. The coolant bed 18 is made up of chips of steel or sand or similar material adapted to cool the inflating gas as the gas passes through the coolant bed 18. The first plate 16 has slots or other apertures through which the inflating gas passes to the nozzle 10. The cannister cap 12 also includes an optional second plate 17 which also has slots or other apertures. The coolant bed 18 is disposed between the first plate 16 and the second plate 17. Both the first plate 16 and the second plate 17 are arranged with their approximately planar surfaces substantially perpendicular to a longitudinal axis of the pressure vessel 8. The plates 16 and 17 may also be wire mesh screens.

The chamber 11 houses the pyrotechnic material 4. Preferably, the pyrotechnic material 4 occupies approximately half or slightly more than half of the total volume of the chamber 11. Preferably, the pyrotechnic material 4 is made up of grains which are compacted, that is, pressed together in the shape of a cylinder. The chamber 11 also preferably has a plenum chamber 20 which includes the volume of the chamber 11 between the cannister cap 12 and the pyrotechnic material 4. The plenum chamber 20 is located between the second plate 17 and the pyrotechnic material 4. The plenum chamber 20 accommodates expansion of the gas generated by the pyrotechnic material 4. Preferably, the outer surface of the pyrotechnic material 4 between the pyrotechnic material 4 and the walls of the chamber 11 and between the end of the pyrotechnic material 4 adjacent to the plenum chamber 20 and the plenum 20 has a coating of a chemically inert inhibitor, such as a ceramic material. This coating keeps such outer surface of the pyrotechnic material 4 from igniting or at least delays ignition on such outer surfaces of the pyrotechnic material 4. For example, the inhibitor may be Sauereisen #30 or Sauereisen #63 made by Sauereisen Company of Pittsburgh, Pa. The inhibitor is not used on the end of the pyrotechnic material 4 adjacent to ignitor mechanism 6, but only on the end of the pyrotechnic material 4 further away from ignitor mechanism 6.

The ignitor mechanism 6 is adapted to ignite the pyrotechnic material 4 and cause the pyrotechnic material 4 to burn. In this illustrative embodiment, the ignitor mechanism 6 is located at the opposite end of the cannister from the nozzle 10. The ignitor mechanism 6 includes: a striker 22, a biasing means (not shown) for the striker 22, a retaining member 24, a primer 26, and an ignition mix 28. The striker 22 has a pivot point 30 at one end, an actuated position, and a non-actuated position. The biasing means may be a coil spring located at the pivot point 30 of the striker 22, biasing the striker 22 in a pivoting direction to pivot clockwise on the pivot point 30 from the non-actuated position of the striker 22 to the actuated position of the striker 22.

The striker 22 is shown in its non-actuated position. The retaining member 24 is adapted to retain the striker 22 in its non-actuated position. The retaining member 24 has a pivot support 32 at one end to support the pivot point 30 of the striker 22 and the biasing means for the striker 22, and a catch 34 at the opposite end of the retaining member 24 to retain the striker 22 in its non-actuated position as shown in FIG. 1. The catch 34 is adapted to be pressed in a direction toward the pressure vessel 8. The catch end of the retaining member 24 adjacent to the catch 34 is resilient enough to bend and to allow the catch 34 to release the striker 22. The striker 22 has a firing head 36, which may have a conical shape. The primer 26 is a percussion actuated primer adapted to be actuated by the striker 22 to provide a thermal signal which initiates combustion of the ignition mix 28. The primer 26 is sensitive to shock resulting from the impact of the firing head 36.

When the catch end of the retaining member 24 is pressed down, i.e. toward the cannister, the striker 22 is released. The biasing means, such as a coil spring, spring loads the striker 22 and causes the striker 22 to pivot approximately 180° upon its pivot point 30 to the actuated position of the striker 22. In its actuated position, the firing head 36 of the striker 22 hits the primer 26. The primer 26 initiates combustion of the ignition mix 28 disposed in an ignition cup 38, which generates hot gas and hot particles, which ignite the pyrotechnic material 4. Combustion of the pyrotechnic material 4 produces the inflating gas for the tire 9. The pyrotechnic material 4 is the sole source of inflating gas for the tire. There is no stored fluid, neither compressed gas nor liquified gas.

The pyrotechnic material 4 has an ignition end adjacent to the ignition mechanism 6 and a nozzle end adjacent to the cannister cap 12. The inflating gas is initially generated at the ignition end of the pyrotechnic material 4. As may be seen in in FIG. 2 also, a gas permeable structure, such as a corrugated, expanded or perforated metal structure, preferably a metal screen 40 is disposed around the outer circumference of the pyrotechnic material 4 between the pyrotechnic material 4 and the chamber 11 for the purpose of allowing gas generated at the ignition end of the pyrotechnic material 4 to pass between the outer circumference of the pyrotechnic material 4 and the chamber 11 as the gas moves toward the plenum chamber 20.

In one embodiment an insulation liner 200 is provided over at least a part and preferably all of the internal surface of the pressure cannister made up of the pressure vessel 8 (chamber 11 and pressure cannister cap 12) to reduce the temperature level of the pressure cannister to a level acceptable to an external insulation such as plastic or paper, will be later discussed, of about 350° F.

The internal insulation liner applied to the interior surface of the pressure cannister is, in one embodiment, a plastic liner which gives up water of hydration at a temperature below about 350° F. Plaster of paris has been found desirable, and it has been found advantageous to add to the plaster of paris other compounds to modify the dehydration temperature. The addition of epsom salt or copper sulfate has been found advantageous for this purpose, for example.

Alternately, in one preferred embodiment other endothermically decomposing compounds may advantageously be used as the liner, such as $KHCO_3$, which produces $CO_2$ on decomposition instead of water.

In another preferred embodiment, see FIG. 3, the liner 200 is an air gap, preferably about 2.0 to 5.0 mm, formed in the cannister so that the internal wall 300 surrounding the pyrotechnic in the chamber 11, as well as the cannister cap 12 (not shown in FIG. 3), does not touch the outer wall 400 on which the insulation 48 is placed on its outer surface, except through preferably insulated support spaces. In the exhibit shown in FIG. 3, the air gap is located between walls of the cannister.

The liner 200 keeps the pressure cannister cool (below 350° F) so that with the insulation therearound (to be described just below), the cannister may be safely and conveniently replaced.

An insulator 48 is provided around the outer circumference of the pressure vessel 8. The insulator 48 is cylindrical in shape and extends from the pressure cannister cap 12 along approximately the length of the chamber 11. The insulator 48 may include one or preferably two layers of an insulating material, such as corrugated paper, plastic, or metal.

The nozzle 10 has a tire end and a pyrotechnic end. The pyrotechnic end of the nozzle 10 is connected to a mouth 41 of the cannister cap 12. The tire end of the nozzle 10 has a resilient insert 500, preferably rubber or resilient plastic for mating with the metal screw threads 43 of the tire inflator, or for being pushed thereon. The tire end of the nozzle 10 has a well 42. The tire end of the nozzle 10 is adapted to fit over and around the outer circumference of tire valve 7. The well 42 is dimensioned so that the tire valve 7 fits into the well 42. The insert 500 is located in the well 42 on the inside walls of the nozzle 10. In a preferred embodiment the wall 501 of the nozzle is spun over the insert. The inside surface 502 of the insert 500 is tapered for reception of the valve, and retention of the valve in the insert in a sealed relationship, either by mating it with the screw thread or pushing it thereon, causes the insert to compress when a removal force is exerted. Rubber is preferred for the insert material, and it permits misalignment of the unit when installed in the tire valve, and the resultant cross threading. The nozzle 10 also includes an optional stem depressor 44 for depressing the valve stem 45 of the tire valve 7 to allow inflating gas to pass through the tire valve 7 into the tire 9. The stem depressor 44 is a stationary pin which extends through a nozzle bore 46 in the pyrotechnic end of the nozzle 10. The nozzle bore 46 extends from the pyrotechnic end of the nozzle 10 to the well 42 of the nozzle 10. The nozzle bore 46 conducts inflating gas from the pressure vessel 8 around the stem depressor 44 at the well 42. The stem depressor 44 is fixedly attached to the slotted plate 16.

A safety cap 50 is disposed over the ignitor mechanism 6 and around the ignitor end of the cannister. Preferably, safety cap 50 is attached to or in abutting contact with the insulator 48. The outside end of the safety cap 50 opposite from the insulator 48 has a membrane 52 around a major part of the circumference of the safety cap 50. The membrane 52 is adapted to be ruptured by the user, such as by use of his thumb. The safety cap 50 also has an indented portion 53 at the opposite side of the safety cap 50 from the membrane. The indented portion 53 functions as a hinge after the membrane 52 is ruptured, enabling safety cap 50 covering the ignitor mechanism 6 to be bent back upon the indented portion 53, providing access to the ignitor mechanism 6.

In operation, the user removes the safety cap 50, attaches the nozzle 10 to the tire valve 7 to depress the valve stem 45 and depresses the catch 34. This releases the striker 22 which hits the primer 26. This ignites the ignitor mix 28 which causes the pyrotechnic material 4 to burn. The inflating gas generated upon combustion passes through the metal screen 40, in contact with liner to the plenum chamber 20, the coolant bed 18, the nozzle bore 46, the well 42, and the tire valve 7 and into the tire 9.

Referring to FIG. 2, one embodiment of the tire inflator has an over pressure relief means 54 provided in the cannister cap 12. The over-pressure relief means 54 is a safety device for release of excess pressure in the pressure vessel 8. The relief means 54 operates in conjunction with an aperture 56 in the cannister cap 12. The over-pressure relief means 54 may be a rupture disc 58, as illustrated in FIG. 1. Referring to FIG. 1, the rupture disc 58 is adapted to rupture if the pressure in the pressure vessel 8 exceeds a predetermined pressure level. The rupture disc 58 is adapted to rupture at a pressure level lower than the pressure level at which the pressure vessel 8 would rupture. The rupture disc 58 is disposed inside the cannister cap 11 and covers the aperture 56.

The pyrotechnic material 4 may have a composition such as that disclosed in U.S. patent application Ser. No. 500,810 filed Aug. 26, 1974, entitled "Low Temperature Gas Generated Propellant", which is a continuation-in-part application of parent application Ser. No. 395,481, filed Sept. 10, 1973, entitled "Pyrotechnic Composition With Combined Binder-Coolant", both filed in the name of E. F. Garner and having a common assignee with the present invention. In general, the pyrotechnic composition comprises a fuel; an inorganic oxidizer; and a coolant or combined binder and coolant (which also is referred to as just a coolant in the following description). The coolant is selected from the group consisting of magnesium carbonate, magnesium hydroxide, and a mixture of magnesium carbonate and magnesium hydroxide. It has been found that one may use as much of the binder-coolant as is necessary in the pyrotechnic material 4 to obtain the desired binder properties for the composition without raising the flame temperature of the gas, generated upon combustion, to an unacceptable level. The fuel may be selected from the group consisting of a carbonaceous material (such as carbon, carbon black or lamp black), aluminum and magnesium. The inorganic oxidizer may be selected from the group consisting of an alkali metal chlorate (such as potassium chlorate or sodium chlorate), an alkali metal perchlorate (such as potassium perchlorate or sodium perchlorate), an alkali metal nitrate (such as potassium nitrate or sodium nitrate). The coolant or combined binder and coolant may be selected from the group consisting of: magnesium carbonate, magnesium hydroxide, and a mixture of magnesium carbonate and magnesium hydroxide. A typical formulation of this pyrotechnic composition comprises: carbon which acts as a fuel; potassium chlorate ($KClO_3$) or potassium perchlorate ($KClO_4$) which acts as an oxidizer; and magnesium carbonate ($MgCO_3$) which acts as a coolant and binder.

The pyrotechnic material 4 comprises by weight: from less than 1 to about 10% of one of the foregoing fuels, such as carbon; from about 30 to about 70% of one of the foregoing inorganic oxidizers, such as potassium chlorate; and from about 10 to about 60% of one of the foregoing coolants or combined binders and coolants, such as magnesium carbonate or a mixture of magnesium carbonate and magnesium hydroxide.

We claim:
1. A light, portable, miniaturized tire inflator pressure cannister for inflating a tire having an inlet valve, and adapted to be carried in one hand, comprising:
a pyrotechnic material as sole source of inflating gas located within an inner surface of the cannister to generate the inflating gas upon ignition to inflate the tire, without a source of stored fluid;
an ignitor mechanism located adjacent to said pyrotechnic material to ignite and cause said pyrotechnic matrial to burn;

said pressure cannister comprised of a pressure vessel to hold said pyrotechnic material, said pressure vessel having a tire end and a pyrotechnic end, and a pressure cannister cap, a portion of which is adapted to fit at the outer edge of said tire end of said pressure vessel;

a nozzle mounted on said pressure cannister cap, said nozzle including a flexible insert mounted thereon, the insert connecting directly to the valve of the tire; and an internal insulation liner composed of an endothermically decomposing compound located on substantially the entire interior surface of said cannister for maintaining the temperature of said cannister at about 350° F. or below during generation of said inflating gas.

2. A pressure cannister as claimed in claim 1, the insert being rubber.

3. A pressure cannister as claimed in claim 1, the insert tapered for reception of the valve.

4. A pressure cannister as claimed in claim 1, the insert being spin mounted with the nozzle.

5. A pressure cannister as claimed in claim 1, the liner comprising an air gap adjacent to the inner surface of the cannister.

* * * * *